UNITED STATES PATENT OFFICE.

WILLIAM J. KLAPP, OF OSAGE MISSION, KANSAS.

IMPROVEMENT IN MEDICAL COMPOUNDS.

Specification forming part of Letters Patent No. 206,676, dated August 6, 1878; application filed May 29, 1878.

*To all whom it may concern:*

Be it known that I, WILLIAM J. KLAPP, of Osage Mission, in the county of Neosho and State of Kansas, have invented a new and useful Medical Compound, of which the following is a specification:

My invention relates to a medical compound to be used as a remedy for spasms, palpitation of the heart, or heart disease, and epileptic fits; and it consists of a composition formed by dissolving in and mixing with cold rain-water bromide of potassium, fluid extract of English valerian, bromide of ammonium, fluid extract of skull-cap, fluid extract of bitter-sweet, fluid extract of black cohosh, fluid extract of hyoscyamus, fluid extract of stramonium, and fluid extract of belladonna.

To prepare my medicine, take twenty-four (24) ounces of water, and dissolve in that and therewith mix the above-mentioned ingredients, in the following proportions, to wit: Bromide of potassium, seven ounces; fluid extract of English valerian, two and one-half ounces; bromide of ammonium, two ounces; fluid extract of skull-cap, one-half ounce; fluid extract of bitter-sweet, one-half ounce; fluid extract of black cohosh, three-quarters of one ounce; fluid extract of hyoscyamus, three drams; fluid-extract of stramonium, two drams; fluid extract of belladonna, fifty drops.

The dose for an adult will be a table-spoonful three times a day before eating; for children under fifteen and over seven years old, one half a table-spoonful three times a day before eating; seven years old and under, one-fourth of a table-spoonful three times a day before meals, until cure is effected.

I am aware that a compound consisting of bromides of potassium and ammonium, fluid extracts of valerian and cohosh, is not new, and therefore not my invention.

What I claim as my invention, and desire to secure by Letters Patent, is—

A medical compound as a remedy for spasms, palpitation of the heart, and epileptic fits, consisting of a fluid compound prepared of bromide of potassium, fluid extract of English valerian, bromide of ammonium, fluid extract of skull-cap, fluid extract of bitter-sweet, fluid extract of black cohosh, fluid extract of hyoscyamus, fluid extract of stramonium, fluid extract of belladonna, and water, mixed in the proportions as above substantially described.

In testimony whereof I have hereunto subscribed my name in the presence of the subscribing witnesses.

WILLIAM J. KLAPP.

Witnesses:
   D. D. KLAPP,
   COLUMBUS AMICK.